Jan. 5, 1965  W. S. LEE  3,164,172
COMBINATION PRESSURE REGULATOR AND MANUAL ON-OFF VALVE
Filed March 11, 1960
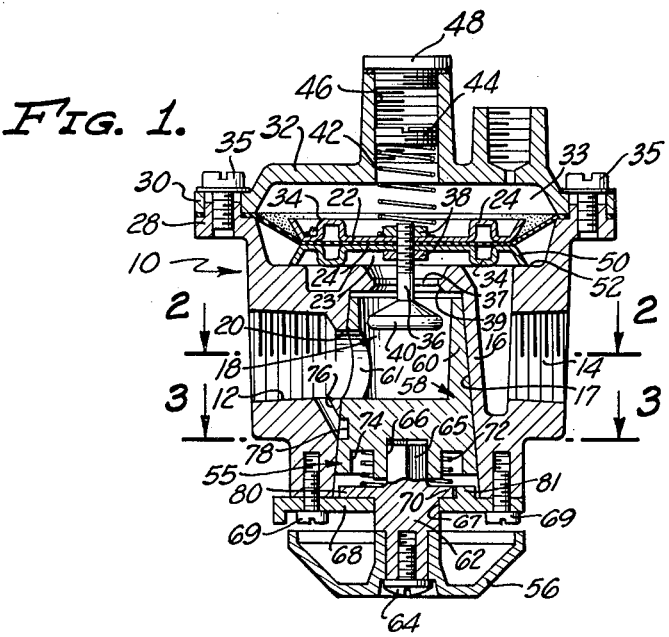
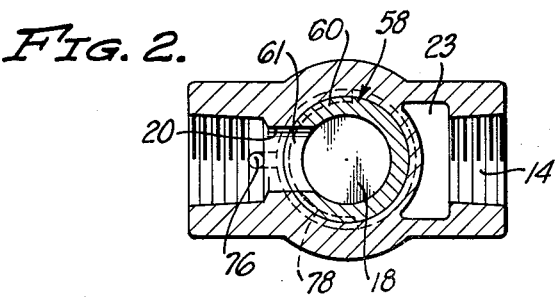
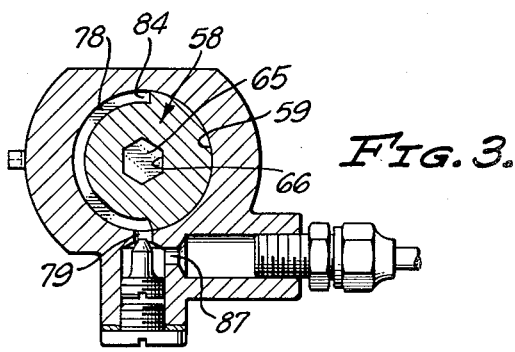
INVENTOR
WALTER S. LEE
BY HIS ATTORNEYS
HARRIS, KIECH, RUSSELL & KERN

United States Patent Office 3,164,172
Patented Jan. 5, 1965

3,164,172
COMBINATION PRESSURE REGULATOR AND
MANUAL ON-OFF VALVE
Walter S. Lee, % Major Controls Co., P.O. Box 537,
Corona, Calif.
Filed Mar. 11, 1960, Ser. No. 14,445
3 Claims. (Cl. 137—612.1)

This invention relates to gas control and pressure regulator valves suitable for use with household furnaces, space heaters, hot water heaters and the like, and is particularly concerned with the provision of a compact integral valve structure incorporating a pressure regulator and manual valve serving as a main on-off valve as well as controlling the flow of gas to the burner and pilot light.

In conventional systems for control of gas flow to gas appliances of this type there is a pressure regulator separate from other control devices such as a pilot valve and a main on-off control. Thus, in these prior art installations, it is necessary to handle several valves in adjusting the flow of gas to the burner, which is a disadvantage. Also, such systems require a plurality of separate valves, thus increasing the cost of these systems.

It is an object of this invention to design a gas control system comprising a main on-off valve, a pilot control valve and a pressure regulator embodied in an integral structure.

Another object of the invention is the provision of a gas control system in the form of a compact package having in combination a gas pressure regulator and a manual valve arranged and constructed so that the latter serves as a main on-off valve and controls the flow of gas to the burner and the pilot light.

Other objects and advantages will be apparent from the following description of the invention.

The gas control system of the invention is compactly designed to provide a valve structure in which the pressure regulator is positioned directly opposite the main on-off control valve, and the latter valve is constructed so that in addition to serving to control the flow of gas to the burner, it also controls the flow of gas to the pilot light. A valve portion of the pressure regulator is mounted within the main control valve, substantially contributing to a compact design. In this construction the pressure regulator is located downstream of the main on-off valve and the pilot control valve.

The valve structure of the invention comprises a body having a first chamber and a main gas inlet to such chamber. A second chamber is also provided in the valve body adjacent the first chamber, the two chambers being separated by a wall. In such wall is an opening which serves as an outlet from the first chamber which communicates with the second chamber. A diaphragm is mounted in the second chamber, forming a wall thereof, and an outlet is provided from the second chamber which communicates with the burner. A first valve member extends into the first chamber and is mounted on a stem which is connected centrally to the diaphragm, and passes through the opening in the wall between the first and second chambers. The periphery of such opening forms a seat for the first valve member. On the other side of the diaphragm is provided a third chamber containing means for controlling the pressure on the diaphragm.

The diaphragm and associated valve member comprise a gas pressure regulator. When the pressure of the gas passing into and through the first and second chambers to the burner via the outlet in the second chamber increases above the regulated pressure the diaphragm is urged in a direction to cause the first valve to move toward its seat and restrict the opening between the first and second chambers and thus restrict the flow of gas to the burner.

A manually rotatable main valve includes a second valve member in the main valve body directly opposite the pressure regulator. The second valve member has a wall portion in the first chamber and is mounted for rotation closely adjacent the wall separating the first and second chambers, and across the inlet to the first chamber. The wall portion of the second valve member forms a closure over the inlet to the first chamber, such wall portion having an aperture permitting communication between such inlet and the first chamber when the second valve member is rotated to a position to align such aperture with the inlet.

In the external wall of such second valve member is an arcuate groove forming a chamber which is closed by the adjacent wall of the valve body. A passage or orifice is provided in the valve body connecting the main gas inlet upstream of the first chamber with the above-mentioned groove and chamber when the second valve member is manually rotated to align the groove with the orifice. In such position of the second valve, an outlet connects such groove with the pilot light of the burner.

There is thus provided in an integral compact construction the main on-off control valve for the burner, pressure regulator and control valve for the pilot light. The manual control valve is placed directly opposite the pressure regulator with a portion of such manual control valve and the pressure regulator valve both disposed within the first chamber. The second chamber is offset axially from the first chamber and the main inlet and outlet for the burner are preferably axially aligned. The passage and associated chamber formed by the groove in the manual control valve for operation of the pilot light are also axially offset from the axis of the main inlet and outlet of the valve body. All of the above features contribute to a much more compact structure as compared to prior art systems.

The manually operated second valve is rotatable between three positions. In position one the main inlet is closed off and the groove in the second valve member is out of registry with the orifice, closing off the pilot light. In position two the main inlet is closed off, but the groove in the second valve member now communicates with the orifice and the pilot light is on. In position three, the aperture in the wall portion of the second valve member is in registry with the main inlet and the burner is on, and also said groove communicates with the orifice so that the pilot light is also on. Hence, the valve construction of the invention facilitates control of both the main inlet to the burner and the pilot light by means of a single control valve.

The invention will be understood more clearly by the description below of a preferred embodiment, taken in connection with the accompanying drawing wherein:

FIG. 1 is a vertical cross-sectional view of a combination valve constructed in accordance with the teachings of the invention;

FIG. 2 is a horizontal cross-sectional view taken along the line 2—2 of FIG. 1; and FIG. 3 is a horizontal cross-sectional view taken along the line 3—3 of FIG. 1.

Referring to the drawing, numeral 10 represents a valve body having a threaded main gas inlet passage 12 adapted to be connected to a gas main (not shown) and a threaded gas outlet passage 14 adapted to be connected to a gas burner (not shown). Within the valve body 10 and integrally formed therewith is an upwardly extending conically shaped wall 16. The inner surface 17 of the conical wall 16 defines a first main chamber 18 within the valve body. An inlet port 20 is provided for communication between the inlet passage 12 and the chamber 18.

he valve body 10 provides an upwardly directed peripheral wall 28 at the upper end thereof which defines a portion of a chamber 23 and supports a cover member. The cover member 32 is secured to the wall 28 by screws 35 or any conventional means. A chamber 33 is provided within the cover member 32 and separated from chamber 23 by a diaphragm 22 mounted over the peripheral wall 28 of the valve body 10 and clamped between such wall and a peripheral flange 30 of the cover member 32. The diaphragm is further secured by any suitable means between a pair of oppositely disposed supporting plates 24 having reinforcing ridges 34.

A stem 36 is threadedly mounted centrally through the diaphragm 22, the plates 24, and washers 38 positioned on each side of the diaphragm and against the opposing plates. The stem 36 passes through an opening 37 in the top wall 16 of the valve body, there being a valve seat 39 adjacent the opening. At the lower end of stem 36 is mounted a first valve member 40 extending into the chamber 18. An adjustable compression spring 42 is positioned with one end against the central portion of the upper plate 24 and about one of the washers 38, the other end of the spring abutting an adjusting screw 44 threadedly mounted in a threaded control opening 46 in the cover, the opening also being provided with a sealing plug. The adjustable spring 42 urges the diaphragm 22 inwardly, as viewed in FIG. 1, against the pressure of gas on the lower face of the diaphragm 22. In FIG. 1 the diaphragm is shown in its extreme downward position, determined by contact between a peripheral flange on the lower plate 24 and a shoulder 52 formed in the valve body 10.

In this position of the diaphragm the valve member 40 is displaced a maximum distance from its seat 39, permitting maximum flow of gas from the main gas inlet 12 through the port 20 into the chamber 18 and through the opening 37 into the chamber 23 and then through the outlet 14 to the burner. If the gas pressure in the main chamber increases to exceed the pressure applied to the top of the diaphragm in the chamber 33, the diaphragm will be urged upwardly carrying the valve member 40 upwardly toward the valve seat 39, thereby restricting the flow of gas to the burner.

A manually operated rotatable valve 55 manipulated by a handle or knob 56 has an upwardly extending conically shaped valve member 58 having an upwardly extending peripheral wall 60. The valve 55 mates snugly with the conical interior surface 17 of the wall 16 within the chamber 18 and is rotatable with respect to such surface. The wall 60 of the valve member 58 is provided with an aperture 61 which, on rotation of the valve member 58, can be made to register with the port 20, as seen in FIGS. 1 and 2, to provide communication between the gas inlet 12 and the chamber 18.

The handle or knob 56 is attached to a post 62 by means of a screw 64 and the post 62 carries a mating pin 65 at its inner end which is received in a mating cavity 66 of the valve member 58 to cause rotation of such valve member upon corresponding rotation of the knob 56. The post 62 is maintained in axial position by passage through an aperture 67 in a cover plate 68 connected to valve body 10 by screws 69. The post 62 provides a stop plate 70 which is urged against the cover plate 68 by a valve spring 72 seating in an annular pocket 74 of valve member 58, one end of said spring abutting the stop plate 70 and the other end pressing against the valve member 58 to seat it relative to the conically shaped interior surface 17 of the wall 16.

Referring to FIGS. 1 and 2, a small passage 76 extends obliquely downwardly through the valve body 10, connecting at one end with the gas inlet passage 12 at a point upstream of the inlet port 20 and continuing downwardly to the interior surface 17 of the conically shaped wall 16 of the valve body 10. Adjacent the lower end of the passage 76 the valve member 58 is cut away to form an arcuate groove 78 which extends slightly more than 180° about the periphery of the valve member. An outlet passage 79 in the valve body 10 communicates with the main chamber 18 in which the valve member 58 is positioned. When the valve is rotated to the position shown in FIG. 3, the outlet passage 79 registers with the chamber formed by the arcuate groove 78. The outlet passage 79 is connected to a pilot light via passage 87.

The manual control valve member 58 is rotatable between three positions. In the position shown in FIGS. 1 to 3, the aperture 61 in the wall 60 of the valve member 58 is in alignment with the port 20 of the inlet passage 12, permitting flow of gas from the main to the burner through the pressure regulator. Also in this position of the valve member 58, the arcuate groove 78 communicates with the passage 76 and with the outlet passage 79 so that the gas inlet 12 is in communication with the pilot light. This is the position of the valve member 58 when the burner is in normal operation.

If the valve member 58 is rotated counterclockwise 180° from the position shown in FIGS. 2 and 3, the aperture 61 will be out of registry with the inlet port 20 and the arcuate groove 78 will no longer communicate with the lower end of the passage 76, so that the gas main inlet 12 will be closed off from both the burner and the pilot light. In this position of the valve member 58 an outwardly extending portion 80 of the stop plate 70 will strike a lug 81 on the cover plate 68, preventing further counterclockwise rotation of the valve member 58. If the valve member 58 is now rotated 90° clockwise from this latter position, the aperture 61 will be out of registry with the inlet port 20 but an end 84 of the groove 78 will register with the lower end of the passage 76. In this position, the gas inlet to the burner is cut off, but the gas to the pilot light is on. By turning the valve member 58 clockwise 90° more from the latter position, the valve 58 will now be in the position shown in the drawing wherein the gas inlet to the burner is on and also the gas inlet to the pilot light is on. Hence it is seen that manual valve 58 is rotatable into three positions: (1) main off and pilot off, (2) main off and pilot on, and (3) main on and pilot on.

It will be noted that the valve member 40 of the pressure regulator is positioned in the chamber 18 and within the conical shaped wall 60 of the valve member 58, thus making for compactness of the valve structure. Compactness of design is further attained by the positioning of the manual valve 58 and its associated structure directly opposite the pressure regulator between the main gas inlet 12 and the gas outlet 14 of the system, with the chamber 23 adjacent the pressure regulator diaphragm 22 offset from the axis of such inlet and outlet. The combining of the pilot control valve with the manual valve for the burner is also a factor in achieving a compact structural package. By combining the elements of the valve in the manner above described and shown in the drawing, there is also substantially less pressure drop than in prior art devices which include the manual valve for the burner, pilot control valve, and pressure regulator in series.

From the foregoing it is seen that I have provided a simplified valve system according to the invention which is compact, easily operated, and efficient.

It is to be understood that various modifications and adaptations of the invention may be made without departing from the spirit of the invention, and the invention is to be taken as limited only by the scope of the appended claims.

I claim:

1. A combination valve, comprising: a housing containing a diaphragm chamber and a central cavity in communication with a valve seat therebetween; a diaphragm member forming an outer wall of said diaphragm chamber; a first valve member responsive to the movement of the diaphragm member and movable between a closed position in which it is in sealing engagement with the valve seat and an open position in which it is spaced from the valve seat toward the central cavity; a main inlet in the housing in communication with the central cavity; a main outlet in the housing in communication with the diaphragm chamber; a pilot inlet in the housing between the main inlet and the central cavity; a pilot outlet in the housing in communication with the central cavity; a cup-like second valve member including a side wall and a bottom portion pivotally mounted in said central cavity and providing a main chamber which receives said first valve member when it is in the open position, said second valve member being movable among a fully open position, a pilot open position, and a closed position; a port in the side wall of said second valve member which registers with the main inlet when said second valve member is in the open position to provide communication between the main inlet and the main chamber, and which is spaced away from the main inlet when the second valve member is in either of the other two positions whereby said side wall closes off the main inlet; passage means in the bottom portion of said second valve member providing communication between the pilot inlet and the pilot outlet when said second valve member is in both the fully open position and the pilot open position, and which is spaced from the pilot inlet when said second valve member is in the closed position so as to close off the pilot inlet; and control means operable from outside the housing for moving the second valve member between said positions.

2. A combination valve, comprising: a housing containing a diaphragm chamber and a central cavity in communication with a valve seat therebetween; a diaphragm member forming an outer wall of said diaphragm chamber; a first valve member responsive to the movement of the diaphragm member and movable between a closed position in which it is in sealing engagement with the valve seat and an open position in which it is spaced from the valve seat toward the central cavity; a main inlet in the housing in communication with the central cavity; a main outlet in the housing in communication with the diaphragm chamber; a pilot inlet in the housing between the main inlet and the central cavity; a pilot outlet in the housing in communication with the central cavity; a cup-like second valve member including a side wall and a bottom portion pivotally mounted in said central cavity and providing a main chamber which receives said first valve member when it is in the open position, said second valve member being movable among a fully open position, a pilot open position, and a closed position; a port in the side wall of said second valve member which registers with the main inlet when said second valve member is in the open position to provide communication between the main inlet and the main chamber, and which is spaced away from the main inlet when the second valve member is in either of the other two positions whereby said side wall closes off the main inlet; an arcuate groove in the outer surface of the bottom portion of the second valve member providing communication between the pilot inlet and the pilot outlet when said second valve member is in the fully open position and in the pilot open position, and which is spaced from the pilot inlet when said second valve member is in the closed position so as to close off the pilot inlet; and control means operable from outside the housing for moving the second valve member between said positions.

3. In a combination pressure regulator and flow control valve which includes a housing having a diaphragm chamber and a central cavity with an inner wall surface, said chamber and cavity being separated by a wall which contains an aperture providing a valve seat, a diaphragm member forming an outer wall of said diaphragm chamber, a main inlet in the housing in communication with the central cavity, and a main outlet in the housing in communication with the diaphragm chamber, the improvement comprising: a pilot outlet in the housing in communication with the central cavity; a cup-like valve member pivotally mounted in said central cavity in sliding sealing engagement with the inner wall surface thereof and extending to adjacent the wall which separates said cavity from the diaphragm chamber, said valve member including a side wall and a bottom portion which define a flow chamber, said valve member being movable among a fully open position, a pilot open position, and a closed position; a port in the side wall of the cup-like valve member adapted to register with the main inlet to provide communication between it and the flow chamber when said valve member is in the fully open position; a passageway in the housing having one end in communication with the main inlet and the other end in communication with the central cavity; a groove in the bottom portion of the cup-like valve member providing communication between said other end of the passageway and the pilot outlet when said valve member is in the fully open position and the pilot open position and closing off said passageway at the central cavity when in the closed position; and a second valve member responsive to the movement of the diaphragm member and movable between a closed position in which it is in sealing engagement with the valve seat and an open position in which it is spaced from the valve seat and positioned in said flow chamber.

References Cited in the file of this patent

UNITED STATES PATENTS

| | | |
|---|---|---|
| 2,147,850 | MacLean | Feb. 21, 1939 |
| 2,298,771 | Lamar | Oct. 13, 1942 |
| 2,515,252 | Niederer | July 18, 1950 |
| 2,743,871 | Heiser et al. | May 1, 1956 |
| 2,747,613 | Reinhart | May 29, 1956 |
| 2,904,068 | St. Clair | Sept. 15, 1959 |